H. AND L. HOPP.
PRICE MARKER SYSTEM.
APPLICATION FILED SEPT. 15, 1919.
1,346,028. Patented July 6, 1920.
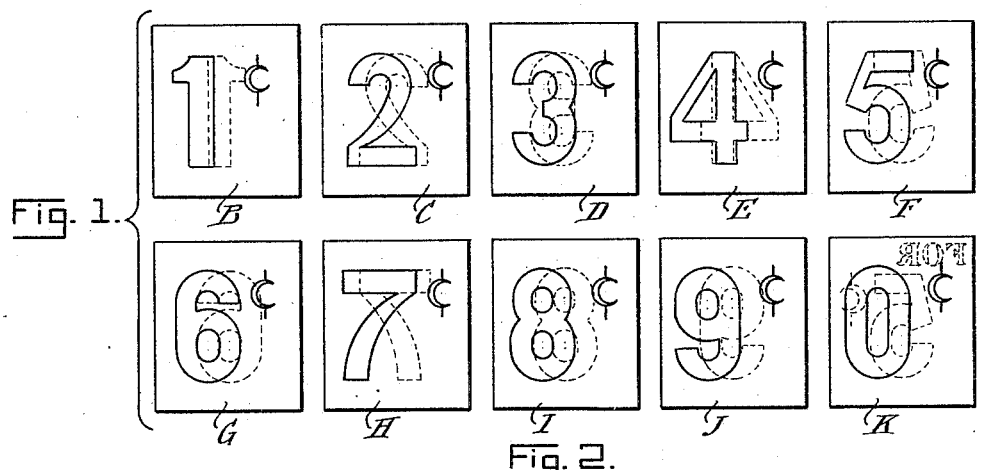
Fig. 1.
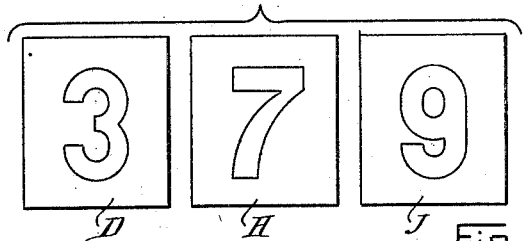
Fig. 2.
Fig. 3.
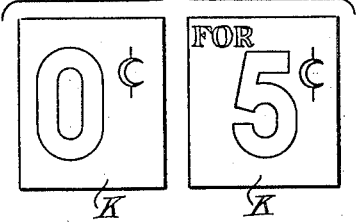
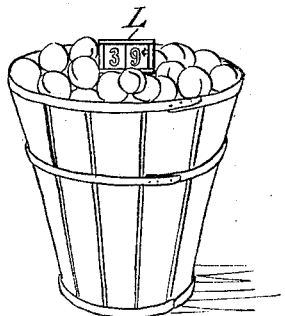
Fig. 4.
Fig. 5. Fig. 6.
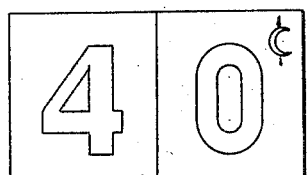 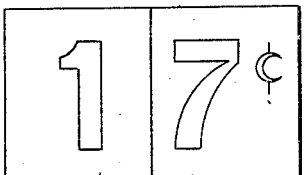
WITNESSES
INVENTORS
Hermann Hopp
Leo Hopp
BY
ATTORNEYS

UNITED STATES PATENT OFFICE.

HERMANN HOPP AND LEO HOPP, OF NEW YORK, N. Y.

PRICE-MARKER SYSTEM.

1,346,028.  Specification of Letters Patent.  Patented July 6, 1920.

Application filed September 15, 1919. Serial No. 323,679.

*To all whom it may concern:*

Be it known that we, HERMANN HOPP and LEO HOPP, citizens of the United States, and residents of the city of New York, borough of Manhattan, county of New York, and State of New York, have invented a new and Improved Price-Marker System, of which the following is a full, clear, and exact description.

This invention relates to price marker systems, or numbered cards used for designating prices of articles offered for sale.

An object of our invention is to provide a simplified price marker system comprising a number of cards which are simple and convenient to handle, and which may be made up into any price denomination from 1¢ to 99¢.

We have primarily in view to provide a set of price marker cards, which set embodies very few cards as compared to the usual system now employed in commercial houses, and particularly in retail establishments where prices vary quite often thereby causing the necessity of carrying on hand an assortment of price cards from 1 to 99 some of which are hardly ever used, and others of the more popular variety constantly running short.

Our invention consists in the novel arrangement of numerals combined with cent marks, a description of which is given in the following specification, and a number of variations in form presented in the appended claims, and one preferred example of which is portrayed in the accompanying drawings, wherein:

Figure 1 illustrates a series of numbered cards which comprises the price marker system here disclosed.

Fig. 2 illustrates several of the cards removed from Fig. 1 and reversed in order to disclose in full lines the numbers on the back side of the cards in Fig. 1.

Fig. 3 illustrates the two sides, or the front and back faces of one card employed in the price marker system. Fig. 4 is presented herewith to illustrate the use of the price marker cards, and merely discloses commodities for sale with price designation placed thereon.

Figs. 5 and 6 respectively show two price combinations made up by employing selected cards from out of a series of ten cards constituting the price marker system.

In practising this invention, we employ ten cards, or separate cards equal in number to the ten ordinals. One side of these cards are printed with plain numbers ranging consecutively from 1 to 9 and a tenth card exhibiting "for 5¢." This is disclosed in dotted lines in Fig. 1. The reverse sides of the series of ten cards are printed with numbers and cent marks from 1 to 9 and a 0 mark included. This is shown in full lines in Fig. 1. By proper selection of two cards and by properly arranging the correct sides, any price combination from 1¢ to 99¢ can be made up.

The cards are made of suitable cardboard or any other material and printed or painted with numbers on one side of each card, said numbers extending from 1 to 9 consecutively. The cards are printed or painted on the other side with numbers extending from 1 to 9 consecutively with a ¢ mark applied adjacent the number. It is desirable to provide a holder for the cards in order that two cards may be placed together to make up a price denomination such as is shown in Fig. 4. Any suitable form of holder or frame L may be employed. The cards are slipped in or out of the frame or holder L at will. The frame or holder securely fixes the cards together in a firm relation so that the price marker may be set on a shelf, placed on a counter, or even in a basket of produce offered for sale such as is illustrated in the drawings.

Fig. 2 is presented to show in full lines numerical features illustrated in dotted lines in the earlier view Fig. 1. In Fig. 2 it is noted that the cards D, H, and J are at reverse sides of the cards D, H and J in Fig. 1.

Fig. 3 illustrates the front and back sides of the card K. On one side of this card is shown a 0¢ mark, and on the reverse side thereof is exhibited the marking "for 5¢." Where articles are sold two, three, four, or more, for 5 cents, the price combination may be made up by using the correct card without the cent mark, say the 3 side of the card D, with the "for 5¢" side of the card K. In this manner any quantity desired from 1 to 9 may be priced at "for 5¢."

Figs. 5 and 6 are presented to disclose how any arbitrary price combination may be formed by properly selecting the cards. For example if it is desired to make up a 40¢ mark, the card E and the card K is employed and so mounted in the holder as to exhibit the two properly selected sides. Referring to Fig. 6 if it is desired to make up the price 17¢, it is only necessary to use the one side of the B card and the 7¢ side of the H card placed together and mounted in the frame or holder L.

The merchant is able at all times to procure any desired price ranging from 1¢ to 99¢ by having on hand one complete set of cards, and he will only need to equip his store with a comparatively small number of card sets in order to be able at all time to post his salable commodities with price markers.

The use of this system will obviate the necessity of keeping on hand a number of sets of cards each separately marked for each price condition. In many instances the merchant is compelled to always carry on hand a full and complete assortment of price cards, ranging all the way from 1¢ to 99¢ to properly meet the various price changes. The invention is presented to fulfil the need felt for an efficient and convenient price marker set used in stores, fruit and vegetable stands.

Having thus described our invention, what we claim as new and desire to secure by Letters Patent is:

1. A card for use in price-marking systems, said card being printed on one side with a numeral only and upon its opposite side with a numeral and a designating character, whereby the card is adapted to be used in either the units or tens position of a multiple digit number, said card when used with the designating character displayed identifying the character of the entire number displayed.

2. A card for use in price-marking systems, said card being printed with a single indicating figure on each of its faces, and an identifying character associated with one only of said indicating figures.

HERMANN HOPP.
LEO HOPP.